(No Model.) 2 Sheets—Sheet 1.

J. W. ALDERSON.
DEVICE FOR CUTTING, HARROWING, AND LOOSENING GROUND.

No. 308,866. Patented Dec. 9, 1884.

Witnesses.
G. A. Haseltine
J. T. White

Inventor.
Jesse W. Alderson
By Seward A. Haseltine
Attorney.

(No Model.)  2 Sheets—Sheet 2.
J. W. ALDERSON.
DEVICE FOR CUTTING, HARROWING, AND LOOSENING GROUND.

No. 308,866. Patented Dec. 9, 1884.

Witnesses.
G. A. Haseltine.
J. T. White.

Inventor.
Jesse W. Alderson
By Seward A. Haseltine
Attorney.

United States Patent Office.

JESSE W. ALDERSON, OF WASHBURN, MISSOURI.

DEVICE FOR CUTTING, HARROWING, AND LOOSENING GROUND.

SPECIFICATION forming part of Letters Patent No. 308,866, dated December 9, 1884.

Application filed April 8, 1884. (No model.)

*To all whom it may concern:*

Be it known that I, JESSE W. ALDERSON, a citizen of the United States, residing at Washburn, in the county of Barry and State of Missouri, have invented certain new and useful Improvements in Devices for Cutting, Loosening, and Harrowing Ground, of which the following is a specification, reference being had therein to the accompanying drawings.

My invention relates to improvements in devices for cultivating corn and other vegetables planted or drilled in rows, the object of which is to provide an easy, convenient, rapid, and thorough means of cutting, loosening, and leveling the soil, and at the same time to destroy grass, weeds, &c. These objects I attain by means of the device illustrated in the accompanying drawings, forming a part of this specification, in which—

Figure 1:
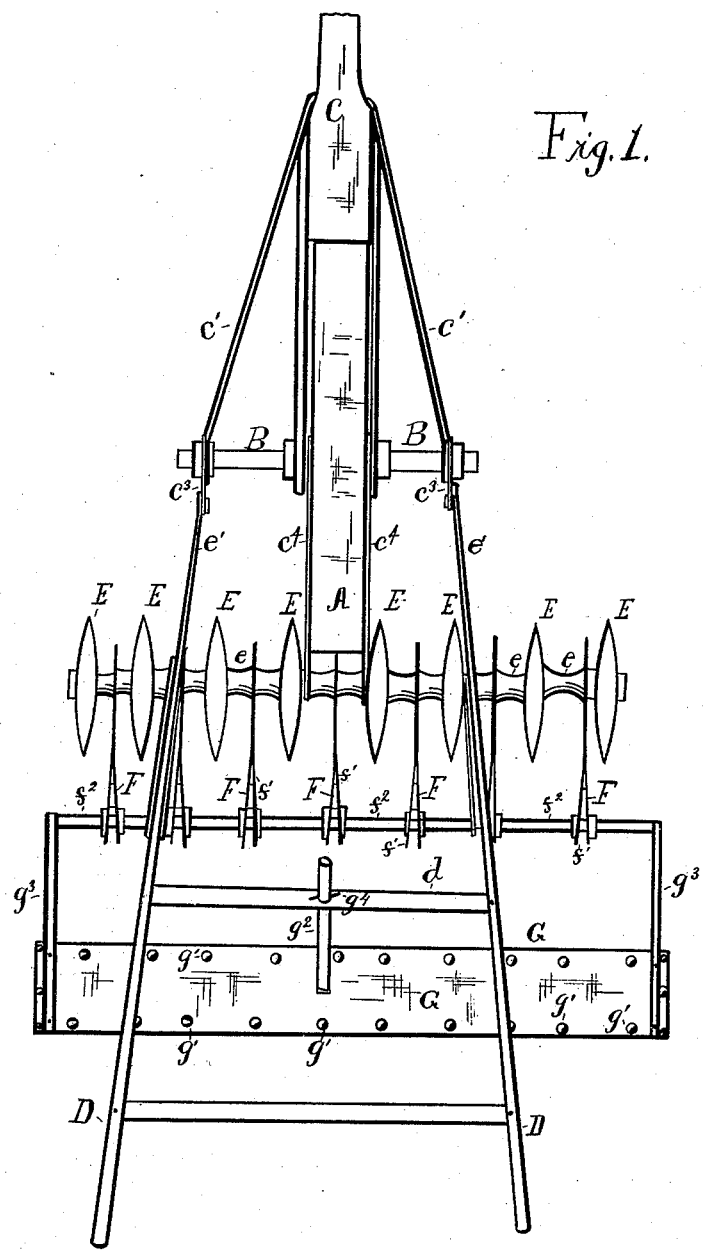
Figure 2:
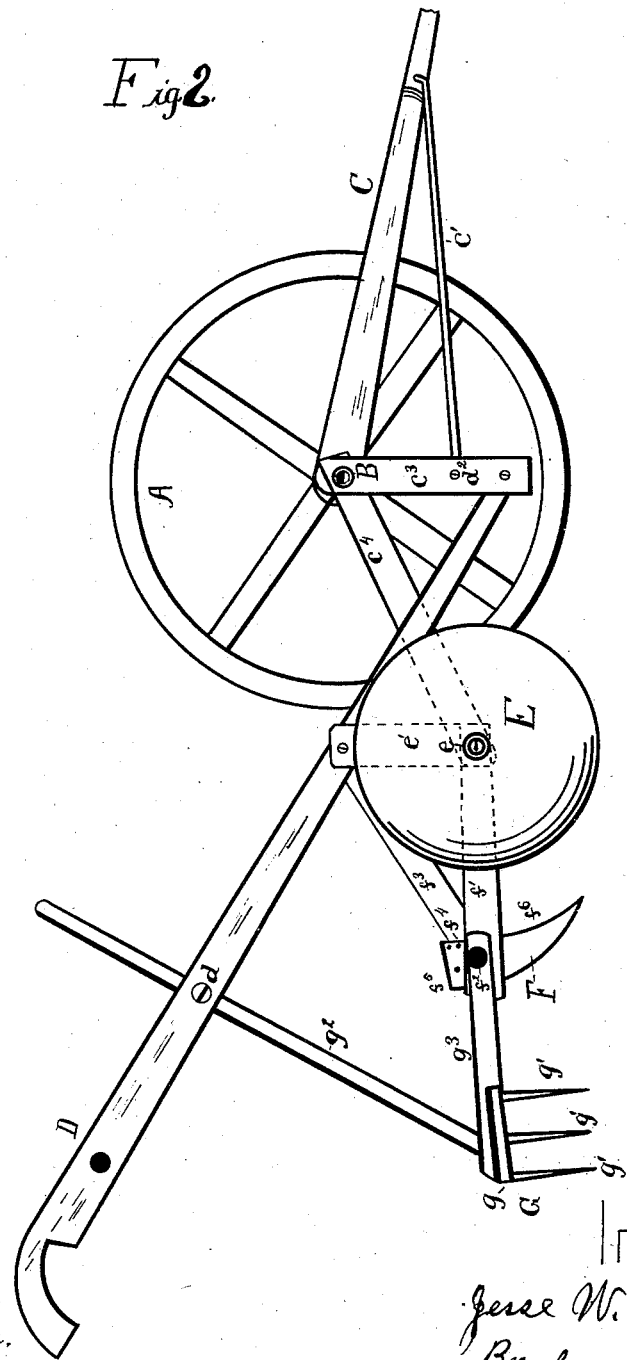

Figure 1 is a top or plan view of the entire device. Fig. 2 is a side view.

A represents a wheel, preferably made large, and having suitable bearings on an axle, B. This axle supports a beam, C, and the attachments for the entire device, as hereinafter explained.

E are cutting-disks attached upon a revolving shaft, $e$. Said shaft has bearings in the supports $c^4$, connecting it with the axle of the wheel A, and in the lower end of the attaching-rods $e'$, by which it is attached to the handles D.

F are plows made sharp and narrow, and having a sharp front edge, $f^6$, and may be of any desired length. Through these plows are holes $f^4$, for a connecting-rod, $f^2$, and $f^5$, for a pin, preferably of wood, to regulate the slant or pitch of the plows, and to serve as safety-pins to break, if necessary, and prevent breaking other parts of the device when the plows get caught. These plows are placed in the forks of arms $f'$, said arms being attached between the revolving disks, so as to cause the plows to follow the disks and loosen the ground between the tracks of the disks. $f^3$ is a connecting-rod attaching the plows to the handles D, so that they may be easily raised from the ground.

G represents a harrow attached behind the plows above described by means of arms $g^3$, attached to the ends of the rod $f^2$, and attached to the handles D by a rod, $g^2$, said rod $g^2$ being made adjustable in length by means of a pin, $g^4$, or other suitable locking device, to permit it to be raised up and down through the cross-piece $d$. This harrow has a cross-piece, $g$, in which are placed one or more rows of teeth $g'$. This harrow serves to smooth the ground and tear loose the weeds and grass that have been cut and loosened by the disks and plows. Handles D are attached to the axle B, preferably by means of a pendent support, $c^3$, on each side of the wheel A, said supports being strengthened by rods $c'$, connecting with it at $d^2$ and in front to the beam C. The handles extend backward to be operated by a man behind the harrow, and they are connected with the harrow, the plows, and disks, as above specified.

A sulky may be formed by placing wheels on the ends of the axle B extended.

In operating the device the large wheel causes the cutting, plowing, and harrowing to be steady and much lighter on the horse and man, as the forward motion is from the axle of the wheel A, and the wheel serves as a fulcrum to raise the back part of the device from the ground. It may be used in many places, and especially in tending corn. It loosens the ground and leaves it free from weeds, at the same time smooth, the better to retain its moisture.

When desired, the harrow can be detached or the plows dispensed with; but it is preferable in general use to have all parts in use at once, as described.

One or more horses may be attached, and different-sized plows, known as Nos. 1 and 2, may be used.

The device may be made of any desired width, and also so as to be adjustable to the width of the row.

Having thus described the construction and use of my invention, what I claim as new, and desire to secure by Letters Patent, is—

1. A device for cutting, loosening, and harrowing ground, composed of a wheel, A, having an axle to which is attached a beam, C, and arms for supporting a revolving shaft on which are cutting-disks E, plows F, attached behind and between said disks, a harrow, G, placed behind the said plows, said disks, plows, and harrow having attachments so as to be drawn by the axle of the wheel A and raised by handles D, all substantially as shown and described.

2. The combination of a wheel, A, with revolving disks E, plows F, and harrow G, said disks, plows, and harrow having attachments with handles D, all substantially as and for the purpose specified.

In testimony whereof I affix my signature in presence of two witnesses.

JESSE W. ALDERSON.

Witnesses:
WILLIAM FERGUSON,
L. B. McNATT.